United States Patent
Jansen

(10) Patent No.: US 7,184,074 B1
(45) Date of Patent: Feb. 27, 2007

(54) TRACTOR/TRAILER BACK UP KIT

(76) Inventor: Rolf Jansen, P.O. Box 73161, Houston, TX (US) 77273

( * ) Notice: Subject to any disclaimer, the term of this patent is extended or adjusted under 35 U.S.C. 154(b) by 982 days.

(21) Appl. No.: 09/232,566

(22) Filed: Jan. 15, 1999

Related U.S. Application Data

(60) Provisional application No. 60/071,830, filed on Jan. 20, 1998.

(51) Int. Cl.
*A47G 23/02* (2006.01)

(52) U.S. Cl. ........................................... 348/151

(58) Field of Classification Search .......... 348/148, 348/149, 151, 152, 169, 170, 61; 296/97.5, 296/97.8; 359/13; 397/184.13; 354/293; 340/903, 902, 435, 436, 932.2, 937
See application file for complete search history.

(56) References Cited

U.S. PATENT DOCUMENTS

| | | | | |
|---|---|---|---|---|
| 5,289,321 A | * | 2/1994 | Secor | 354/293 |
| 5,490,708 A | * | 2/1996 | Lee | 296/97.8 |
| 5,522,639 A | * | 6/1996 | Jaime | 397/184.13 |
| 5,615,023 A | * | 3/1997 | Yang | 359/13 |
| 5,646,614 A | * | 7/1997 | Abersfelder et al. | 340/932.2 |
| 5,666,157 A | * | 9/1997 | Aviv | 348/152 |
| 5,680,123 A | * | 10/1997 | Lee | 348/148 |
| 5,874,989 A | * | 2/1999 | O'Brien et al. | 348/148 |
| 5,892,598 A | * | 4/1999 | Asakawa et al. | 359/13 |
| 5,940,120 A | * | 8/1999 | Frankhouse et al. | 348/61 |
| 5,971,468 A | * | 10/1999 | King | 296/97.5 |
| 5,978,017 A | * | 11/1999 | Tino | 348/148 |
| 6,078,355 A | * | 6/2000 | Zengel | 348/148 |
| 6,172,600 B1 | * | 1/2001 | Kakinami et al. | 340/435 |
| 6,259,475 B1 | * | 7/2001 | Ramachandran et al. | 348/148 |

FOREIGN PATENT DOCUMENTS

DE             3316818         * 11/1984

* cited by examiner

*Primary Examiner*—Tung Vo

(57) ABSTRACT

Two improvements of a closed circuit television system applicable to a motor-freight tractor/trailer rig, or a motor vehicle, to see to the rear when the unaided view is obstructed, comprising:

1. Sunvisor-mounted case (30), with a window (10), for cradling a camcorder-type LCD monitor (32), to provide protection for the monitor from heat, cold, vibrations, and bright sunlight, to allow a driver easy, direct, close-range viewing of the monitor screen, as if the screen were a rear-view mirror, while backing up a motor vehicle, or a tractor with attached trailer.

2. Weather-proofed enclosure (40) for mounting on the reverse side of a plate (34), such as a license plate, located at the rear of a motor vehicle, or trailer, to protect a micro-video, pin-holed lens camera (48).

These two improvements together meet a long-felt but unsolved need in the trucking industry.

2 Claims, 5 Drawing Sheets

TRACTOR/TRAILER BACK UP KIT

CROSS-REFERENCE TO RELATED APPLICATION

This application claims the benefit of Provisional Patent Application Ser. No. 60/071,830, filed Jan. 20, 1998.

BACKGROUND

1. Field of Invention

This invention relates to closed-circuit television, specifically to an improved means, when backing, for a driver of a tractor/trialer rig, or other motor vehicle, to see what is to the rear when the unaided view is obstructed.

2. Description of Prior Art

I was an adjuster for an independent claims service that specialized in on-the-scene accident investigations for motor freight lines that were self-insured; and the most common accident occurred when a tractor/trailer rig was being backed.

When the trailer is the rectangular-box type, the driver can never see what is directly behind his trailer. And much of the time, when backing, he cannot see even in the vicinity of the rear of his trailer, because his tractor is pointed in one direction, and the trailer is pointed in another.

Such manuevering is necessary to get a joined tractor/trailer from the street into a driveway, and then steered so that the rear of the trailer stops just next to a loading dock, or overhead door.

To illustrate the problem, let me describe briefly the varieties of backing accidents that happen repeatedly:

1. Backing into a narrow bay at a loading dock crowded with other rigs, the driver misjudges an angle, and the rear corner of his trailer slashes a gash in the side of a refrigerated trailer loaded with perishables.

2. Backing in a driveway up to an overhead door, a rear corner of the trailer hits the side metal groove in which the wheels of the overhead door travel. The door cannot be lowered. A security problem results.

3. A driver backs up, misjudges, and the rear corner of the trailer hits the overhead door side groove so hard the adjacent brick wall tumbles in. Big security problem. Rain can come in and damage inventory.

4. A driver is following traffic into a busy intersection. A car up ahead stalls or stops. The light changes red. The tractor is into the intersection and is blocking crossing traffic. The driver backs up to get out of the intersection. He backs into a car he did not know was there. The driver of the car says her neck hurts.

5. A fairly new driver goes to a high-rise building of which he is not familiar. He is supposed to make a delivery to a place in the basement. The driver, with long trailer in tow, goes down the ramp toward the basement. At the bottom, above the portal for entrance is a sign that says, Clearance 13 feet. His tractor/trailer has a height of 13 ft. 5 in. He has no choice but to back up the long incline. He does not have a clue as to whether there is a car behind him. He hits a Jeep Grand Cherokee, whose driver is a V.I.P.

6. An experienced driver comes to the address he is seeking. The layout is as follows: A company building near the front. Parking spaces in front. Parking spaces on the extreme side. A driveway that passes in between the main building and side parking spaces. Way in the back, about 100 yards from the street, is a building where truck deliveries are made.

At lunch hour, and when the shift ends, people come out of the main building and get in their cars. All day long salesmen drive up and park. Or other salesmen get in their cars and leave.

Our experienced driver has to run this gauntlet to back up 100 yards from the street. Is it any wonder he hits a car he did not know was going to be in his path?

The driver, whose safety record is now marred, tells me in anguish, "I am backing blind!"

Ideally, there should be someone available at a delivery or pickup site who will personally guide the truck driver in backing up, but in practice such person often is not available; and when a driver goes to hunt such a person, he takes a longer time to make a delivery or pickup.

Consequences of "Backing Blind":

1. Lost profits. If a driver could back in with no strain, he could make more deliveries in a given time and increase the profit of his employer.

2. Lower morale among drivers, who try to keep good driving records, then get tagged for causing an accident when the driver could not see when he was backing.

3. High yearly costs of settling claims that are due to backing accidents.

4. Delays. At the minimum, a backing accident causes a substantial delay, while the driver waits for an adjuster to come to the scene and gather information. Three hours loss of time in making deliveries is average.

5. Difficulty of qualifying drivers. Truck companies have a need for qualified drivers. The hardest part of qualifying is being able to back an 18-wheeler without hitting something. Make backing easier, more good drivers could qualify for jobs.

Closed Circuit Television:

I know of closed circuit television systems being used in backing of motor homes and tour buses, but these systems are not being used by major motor freight lines for a reason, which I will explain shortly.

First, let's state what the essentials are of a closed circuit television system: There is a need for a monitor and a video camera, and a video coaxial cable to connect them, and a power source.

I saw a motor home, in a sales lot, that had a closed circuit television system for backing. At the top of the motor home, at the very rear, was a video camera about 6 inches wide and about 4½ inches tall on its mounting.

Inside the motor home a 12 inch monitor was positioned on passenger side, on the side wall, just behind the passenger door.

To see the monitor, the driver of the motor home would have to turn 135 degrees to his right. The picture he saw was an exact image of the picture the camera, on the roof, was taking.

The problem with this set-up for use in a motor-freight tractor/trailer rig is two-fold:

First, the camera: National Electrical Codes state that electrical wires or telephone wires should be at least 13 ft. 6 in above the pavement where vehicles travel. Therefore, rectangular box trailers are made to barely get under 13 ft. 6 in. A bulky video camera on top of a motor-freight trailer is going to get knocked off, by an overhead wire, the top of an underpass, or the top of the entrance into the basement of a building.

But if the video camera is put down lower, off the roof, and on about the level of a loading dock platform, where its view would be ideal for the truck driver who is backing, the bulky camera within touching distance would be an invitation for vandals.

Second, the monitor: It is too bulky for the confines of a motor-freight tractor. Behind the inside of the passenger door there is no room to mount a bulky 12-inch monitor with a cathode-ray-picture tube.

One sees 7 inch and 5 inch TV monitors, with cathode-ray-picture tube, in stores. They still have a large protruberance in back. In the confines of a motor-fright tractor cab there is not any suitable place to put such a device. The cathode-ray tube and the vibrations inherent in a heavy-duty tractor cab give one doubts about reliability.

OBJECTS AND ADVANTAGES

The idea for an improvement in the typical closed circuit television system, as an aid for a driver of a motor-freight tractor/trailer rig, or other motor vehicle, in backing up, came about in the following way:

I was in a store that sells consumer electronics goods at discount. I noticed a new model of camcorder that had a slim, 3 inch LCD viewfinder on the side, that folded in and out. Before then, I had never seen such a small, thin LCD that showed real pictures, like a closed circuit TV.

I noticed this viewfinder had a couple of drawbacks: You needed to look at the picture directly, not at a side angle, in order to see a clear picture. Also, bright light directed at the picture caused the image to fade.

But the smallness, and especially the thinness kept my attention. Then I thought of a vanity mirror on the passenger side sunvisor of an automobile—the type a lady passenger uses to straighten up her makeup.

I submit to the PTO examiner that is is an unobvious connection—thinness of a camcorder 3" LCD viewfinder and the vanity mirror on the passenger-side sunvisor. But once the connection was made, the rest was simple:

One gets a thin, 3" LCD viewfinder (we can also call it a monitor), and mounts it to the inner retracted side of a driver's sunvisor of a motor-freight tractor, or other motor vehicle.

The viewfinder is thin enough so that when the sunvisor is folded up, it stays folded up and does not fall down from being extended too far by the width of the viewfinder.

How about the two problems I noticed in the discount store? Picture fades in direct sunlight. Picture fades when viewed at an angle. They are gone.

When the truck driver pulls down the sunvisor, the little, slim monitor is right in front of his face; and the direct sun does not get at the picture, because the sunvisor shields from the sun.

The little monitor would be connected to a video coaxial cable. The video cable would connect to a video camera at the back of the trailer, or motor vehicle.

There must be a way to reverse the image of the video camera, so that what the camera sees facing backwards, the driver sees facing forwards—like looking in a rear view mirror.

But upon reflection, I realized just mounting the bare LCD viewfinder on the sunvisor would not solve a newfound problem: Little LCD viewfinders use very little energy; they generate very little heat; properly used, they are very reliable; but the operating temperature, I learned, is from 40° F. to 104° F. (4.4° C. to 40° C.).

A typical small, LCD viewfinder can withstand a storage temperature up to 140° F. (60° C.), but it will not operate until its temperature is lowered to about 104° F., or below.

Heating and air conditioning will moderate the cab temperature while the tractor is being operated, but the concern is when the tractor is parked unoccupied with the windows rolled up.

One solution would be to assign a specific monitor to each truck driver who would be responsible for it (it is his seeing eye through the view blocking box trailer), and who would remove it for periods when the tractor cab would be exposed to buildup of interior temperatures, or to blizzard conditions. But humans can forget.

Subjection to rough vibrations over a period of time may diminish the reliability of the LCD viewfinder.

There was a need to insulate the LCD viewfinder. There was a need to cradle it from vibrations.

Retracting the sunvisor, with mounted viewfinder, provides some insulation from the inner side of the sunvisor and the interior lining under the roof of the tractor cab. A case of the proper material and design would give additional needed protection from heat, cold, and vibrations.

Considering another embodiment: Also, an LCD viewfinder with an insulating covering could provide protection from heat, cold, and would provide some protection from vibrations if the covering had enough cushion to it. But the more cushion, the thicker, not thinner, the viewfinder becomes, and thinness of the viewfinder is needed to function properly, mounted to the inner side of a retracted sunvisor.

A covering is permanently fixed to the bare LCD viewfinder, where the case is not.

A rather loose fitting case that cradled the viewfinder seemed a good choice to lessen effect of vibrations.

There would be a window in the case for the LCD screen.

From now on I will refer to a viewfinder that is not built into the camcorder but is purchased separately as a monitor, because that is the term used by the manufacturers.

An LCD monitor with a 2.9 inch screen, that can be attached to a camcorder, is commercially available from CBM Corporation of America, Los Angeles, whose brand name is CITIZEN. Also, Casio and Sony sell LCD monitors that can be attached to camcorders. The LCD viewfinders that are integral parts of recent designs of camcorders are too costly to buy as a separate part from a manufacturer.

Heavy cotton denim, of the kind used to make stone-washed blue jeans, insulates well from heat and cold. I made a case of this material to cradle the CITIZEN 2.9 inch LCD monitor. There is a window in the case for the monitor screen. The case is made wide enough to enclose the plugs and cables that fit into power and video jacks to the LCD monitor.

On the back of the case is a sewn patch with a slot to fit a banker's clasp, which is a long, thin clip of sufficient length to extend the entire vertical length of the sunvisor, and hold the denim case securely.

I designed the denim case to have a seamless underbody, a soft, rounded form that cradles the LCD monitor and aids in absorbing vibrations.

When the sunvisor-mounted case is in the UP position, the monitor is further insulated by the overhead lining, the interior side of the vehicle roof.

Also, the use of a portable sunscreen to cover the interior of the windshield when the vehicle is parked in the summer sun can diminish buildup of heat.

Getting the Mirror Image

One more thing needs to be done to really increase the effectiveness of the sunvisor-mounted camcorder-type LCD monitor. The image in the screen needs to be a mirror image, like looking in a rear view mirror.

If such an image is possible, then the driver facing forward sees in the monitor screen (when the sunvisor is lowered) what the video camera (mounted at the rear of the vehicle or an attached trailer) sees facing in the opposite direction.

Video cameras have been made that give a mirror image in a monitor. Chinon, a Japanese maker of cameras, used to market a standard-sized video camera that used MOS technology, not the more advanced CCD technology; and this camera, no longer produced by the manufacturer, gave a reverse view image.

But to my knowledge, no video camera is presently being made that gives the mirror image. Although such a camera could be made if a manufacturer chose to make one. Creating the mirror image entails using an integrated circuit that acts as video image inverter.

What I needed was a means to add some component into the video line (coaxial cable) to reverse the image before it got to the monitor screen. (Also, no LCD monitor is available commercially to my knowledge that incorporates a mechanism to create a mirror image on the screen.)

The solution to the problem was easy once I found a key piece of information, but it took me a year to find it. I researched libraries, technical bookstores, a firm that assembles electronic devices, and inquired of two electrical engineers.

One day I was reading the RadioShack catalog. I saw a description for a high insolation switch, that is installed, in line, in a cable television coaxial cable, before the cable reaches the television set in the house. The purpose of the switch is to help prevent signal interference. In small print at the end of the description of the high isolation switch was the word "reversible".

I bought one of the switches. One place on the switch for connecting a coaxial cable says TO TV. Another place for connecting a coaxial cable says TO CABLE. The 75 ohm coaxial cable used in residential cable television connections is the same type used to connect a video camera and a camcorder-type LCD monitor.

connected the high isolation switch in reverse. The section of coaxial cable from a video camera I connected to the place on the high isolation switch that said TO TV. The section of coaxial cable from the camcorder-type LCD monitor I connected to the place on the high isolation switch that said TO CABLE. This produced the perfect mirror image for which I was looking!

The Video Camera

The monitor cannot do its job without the camera. In motor-homes and tour buses that have close circuit television for backing, the typical camera is located on the roof at the rear.

If this is where the camera was put on a motor-freight trailer, the camera would be clipped by electrical and telephone wires over driveways, and clipped by the ceiling of an underpass, and clipped by the entrance to a basement in a high-rise building.

This is because motor-freight trailers are designed to just pass under the minimum height of electrical wires that cross above driveways, namely, 13 ft, 6 in., as set by National Electrical Codes. This clearance of 13 ft. 6 in. is the norm for highway underpasses, and for underground entrances of high-rise buildings where tractor/trailer rigs are admitted.

The typical video camera used in close circuit television systems used on some motor homes and tour buses is about 6 in. in width and about 4½in. in heighth.

The camera has got to come off the roof to apply to the motor-freight trailer!

But the camera of the type used in some motor homes and tour buses is highly visible; it is bulky. Put it down lower, where it would give a direct view to a loading dock; it would invite vandals. The camera has a big eye. "Big Brother is watching you."

The need is for a camera that acts like a closed-circuit television camera, that is mounted at the level of the loading dock, and is invisible.

I submit that such a camera is unobvious to one whose field is close-circuit television systems.

There is a camera, only developed in the past several years, that has been used by a contractor for the U.S. Department of Defense, to successfully measure the trajectory of an artillery shell. The camera was put in the nose cone. Such a camera must be able to withstand tremendous G forces; and since it can do such feat, it certainly should stand up well to the routine bumps and vibrations of the rear of a motor-freight trailer.

It is a micro-video, pin-holed lens camera, based on a CCD (charge coupled device) imager chip. A typical such camera is manufactured by Pioneer, Seoul, South Korea.

A typical micro-video, pin-holed lens camera is commercially available as a circuit board, having dimensions of 1.5"×1.5"×0.75" in depth, and weighing 1 oz. The image is B & W. The minimum illumination is 0.5 LUX, F1.8. It has a field of view of 90 degrees. Power consumption is DC 8–15V, 150 mA. Resolution is 380 TV lines. Putting such a small circuit board camera in an enclosure is essential. PacTec, of Concordville, Pa., sells a suitable heavy-duty, plastic enclosure. The outer dimensions are 2⅜"×2¼"×1". A hole is cut in the front of the enclosure to fit the ⅝" metal housing of the pin hole lens. A second hole is cut into the enclosure as an exit for the power and video cables that attach to the circuit board. A stress-relief device is inserted in this hole to protect the cables and ensure a weatherproofed exit.

My idea is to mount this enclosure, with the micro-video, pin-holed lens camera inside, to the the reverse side of a plate, such as a license plate, located at the back of a box trailer, just beneath the bed of the trailer, in perfect position for the micro-video, pin-holed lens camera to view a backing to a loading dock. A predetermined-sized hole would be put in the plate, so the pin-holed lens could see through.

The result is concealment of the video camera at the most advantageous heighth off the ground.

It is customary to surround the circuit board with an insulating material.

A typical micro-video, pin-holed lens camera circuit board, based on CCD technology, has an ambient temperature operating range of 14° F. to 122° F. (−10° C. to 50° C.).

Surrounding insulating material and the plastic enclosure itself provide protection from winter temperatures.

But, the ⅝ inch metal housing for the pin hole lens is exposed. When the enclosure is tightly mounted against the reverse side of a plate, such as a license plate, said plate may be exposed to blizzard conditions in winter:

Coldness of the plate will transfer to the metal housing of the pin-hole lens, that lies flush against said metal plate.

Coldness will in turn transfer from the housing to contiguous internal camera components. In such a situation the camera may not operate.

A second problem is that the front face of the plastic enclosure does not glue to the metal plate with reliable bonding when this combination is tested at a temperature of a food freezer for 24 hours.

A reliable adhesive bonding would eliminate the need for bolts and nuts that would be partly visible on the front of the plate and would lessen concealment (of the camera).

I found that a metal plate bonds to a glassy surface in a reliable manner when epoxy glue is used; and this bond held reliably in a food freezer.

A third, and last, problem is that when the enclosure is mounted directly against the reverse side of the metal plate (and there is a hole in the plate so the pin hole lens can see through), moisture, dirt, and scratches will get on the pin hole lens.

GE Structured Products Division, Mt. Vernon, Ind., makes a product for window panes in residential houses. It is called LEXAN XL. It is a glass-like, transparent plastic that is ⅛" thick. This plastic has insulating properties. It also has been treated with a coating that makes the pane resistant to ultra-violet radiation.

A section of this plastic large enough for one window pane can be cut up into many panes with dimensions 2⅜"×2¼". I epoxy glue a miniature pane across the front face of the plastic enclosure. This use of a piece of a window pane for residential houses solved all three of the problems mentioned above.

Figure 1:
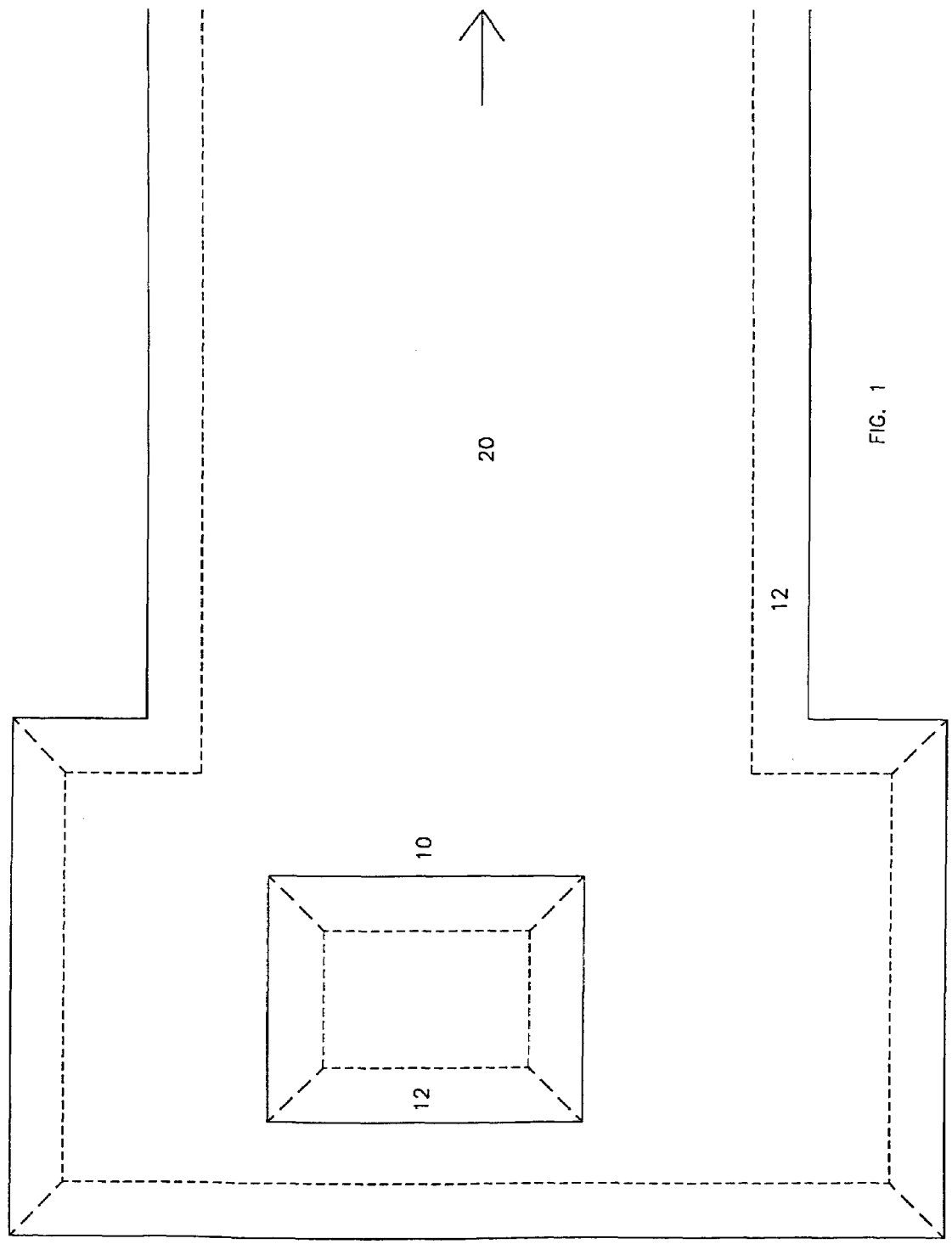
FIG. 1 shows the pattern for making my case; same piece of cloth continues to make top flap, shown in FIG. 2.

| Reference Numerals In Drawings | |
|---|---|
| 10 | window in case |
| 12 | material to fold under to sew hem |
| 14 | patch sewn on back of case to hold banker's clasp |
| 16 | banker's clasp |
| 18 | Velco strips to secure flap |
| 20 | top flap |
| 22 | driver's sunvisor |
| 23 | extended section of case |
| 24 | power cable with plug |
| 26 | video cable with plug |
| 28 | spiral wrap |
| 30 | case |
| 32 | camcorder-type LCD monitor that is inside the case |
| 34 | plate |
| 36 | hole in plate |
| 38 | pane |
| 40 | enclosure |
| 42 | stress relief |
| 44 | power cable |
| 46 | video cable |
| 48 | metal housing for pin hole lens |

SUMMARY

It takes two improvements, working in tandem, to make a tractor/trailer back-up kit that efficiently solves the problem of "backing blind".

These improvements of a closed circuit television system are my sunvisor-mounted case for cradling a camcorder-type LCD monitor and my plate-mounted enclossure for a microvideo, pin-holed lens camera.

DESCRIPTION

1. Sunvisor-Mounted Case for Cradling a Camcorder-Type LCD Monitor:

The case is made of heavy cotton denim, that has been stone-washed to give softness and to forestall any shrinkage. It can be bought from a fabric wholesaler such as AASR, Inc., Houston, Tex.

FIG. 1, in the drawings, shows the actual size of a one-piece pattern to make the denim case. All cloth edges have ¼" allowance for a hem 12, to turn the cloth under and sew it. Without the hems, the denim would unravel a bit and leave loose threads.

This pattern applies for a denim case suitable for a CITIZEN M-329 2.91" LCD monitor, that was designed to be mounted on a camcorder as a viewfinder. This monitor is available from CBM Corporation of America, Los Angeles, Calif. My case can be modified for a Casio or Sony miniature LCD monitor, also, to achieve the same result.

The dimensions of my finished denim case are: 4¾", in width, 3⅜" in heighth, and 1¼" in depth. The design of the case includes a cut-out window 10 for the monitor screen. It is important that the pattern for the case be cut accurately and the ¼" fold-overs for hems be precisely done, in order that the finished case fit precisely the dimensions of the LCD monitor screen.

An inaccurately cut and sewn pattern will show up in a window that does not accurately frame the monitor screen. The result will look bad.

Figure 3:
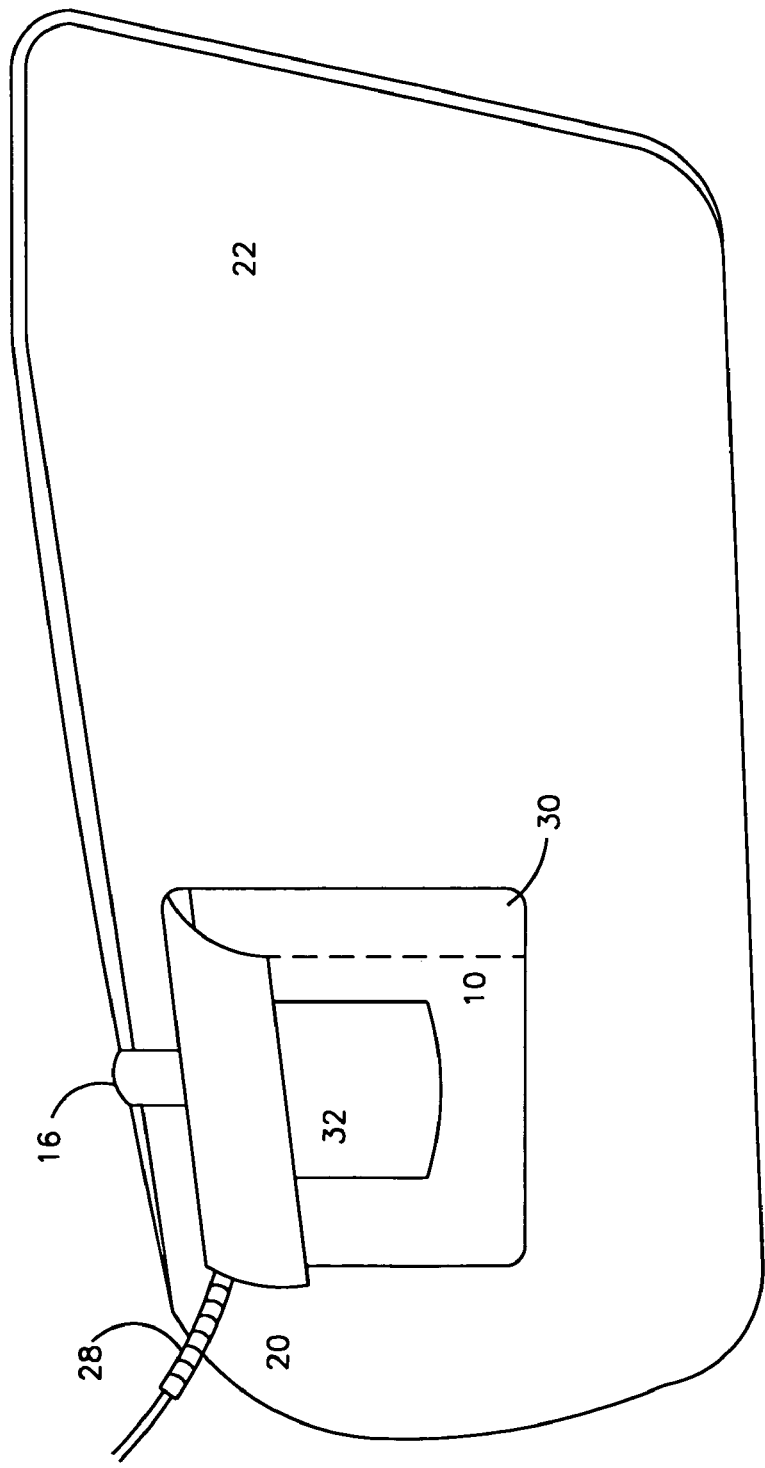
FIG. 3 is a perspective view of the sunvisor-mounted case.

As shown in FIG. 3, the one-piece, wrap-around design of the denim case 30 allows the monitor 32 to lie in a soft, rounded, hammock-like case that gives protection of the monitor from vibrations.

Figure 4:
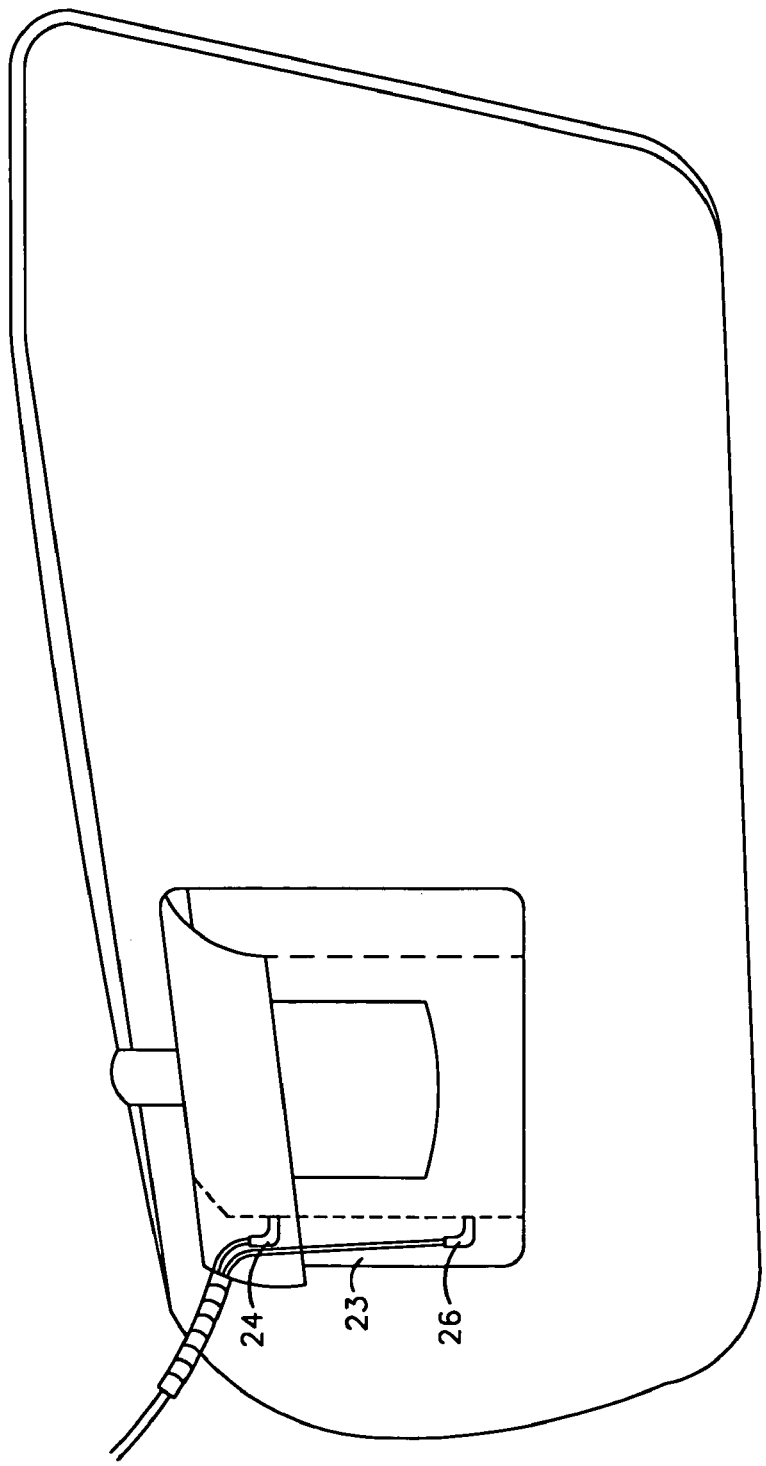
FIG. 4 shows extended section of the case, to absorb vibrations, to hold wires, plugs.
Figure 5:
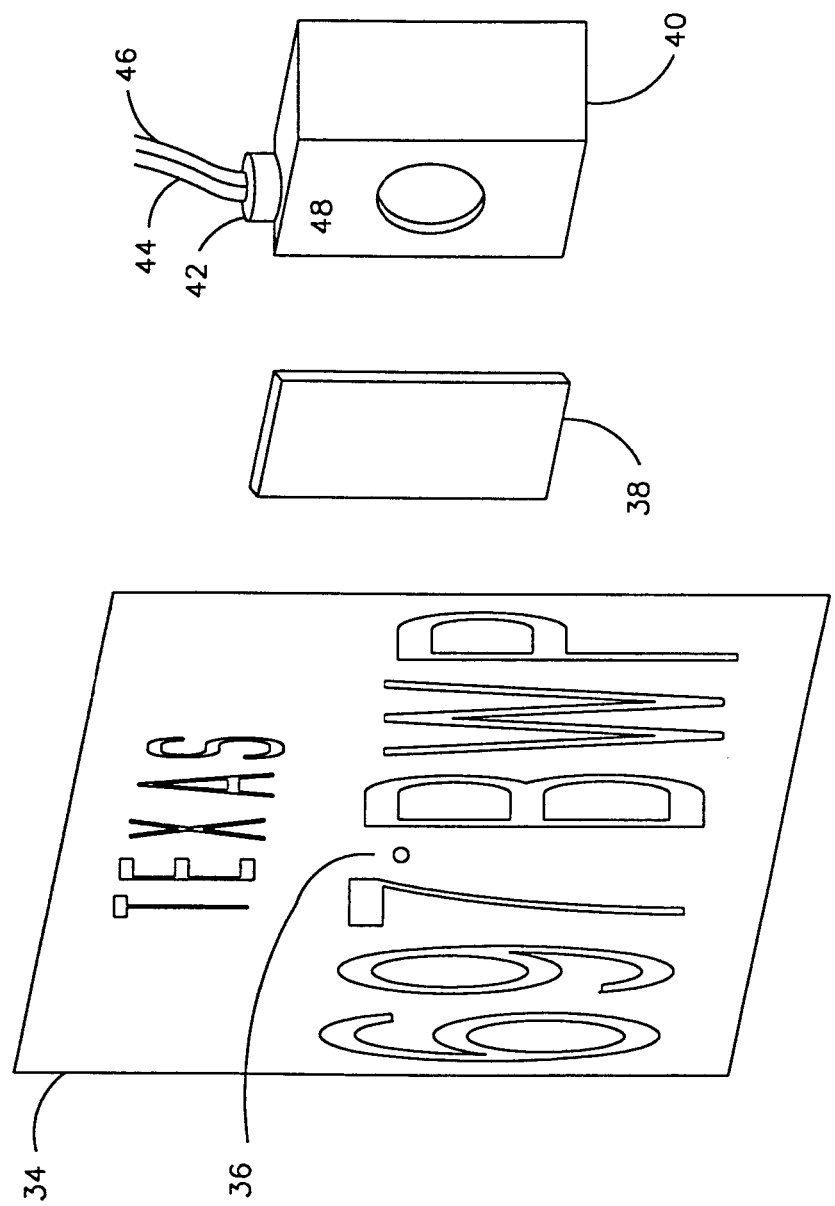
FIG. 5 shows exploded view of my plate-mounted enclosure.

The design of the case includes an extended part of ¾" in width to enclose the cables and plugs 24,26 fitting into video and power jacks on the left side of the monitor. This keeps the plugs from coming looses hides unsightly wires; and the extended space gives a looseness that aids in absorbing vibrations. The extended section is shown in FIG. 4.

Figure 2:
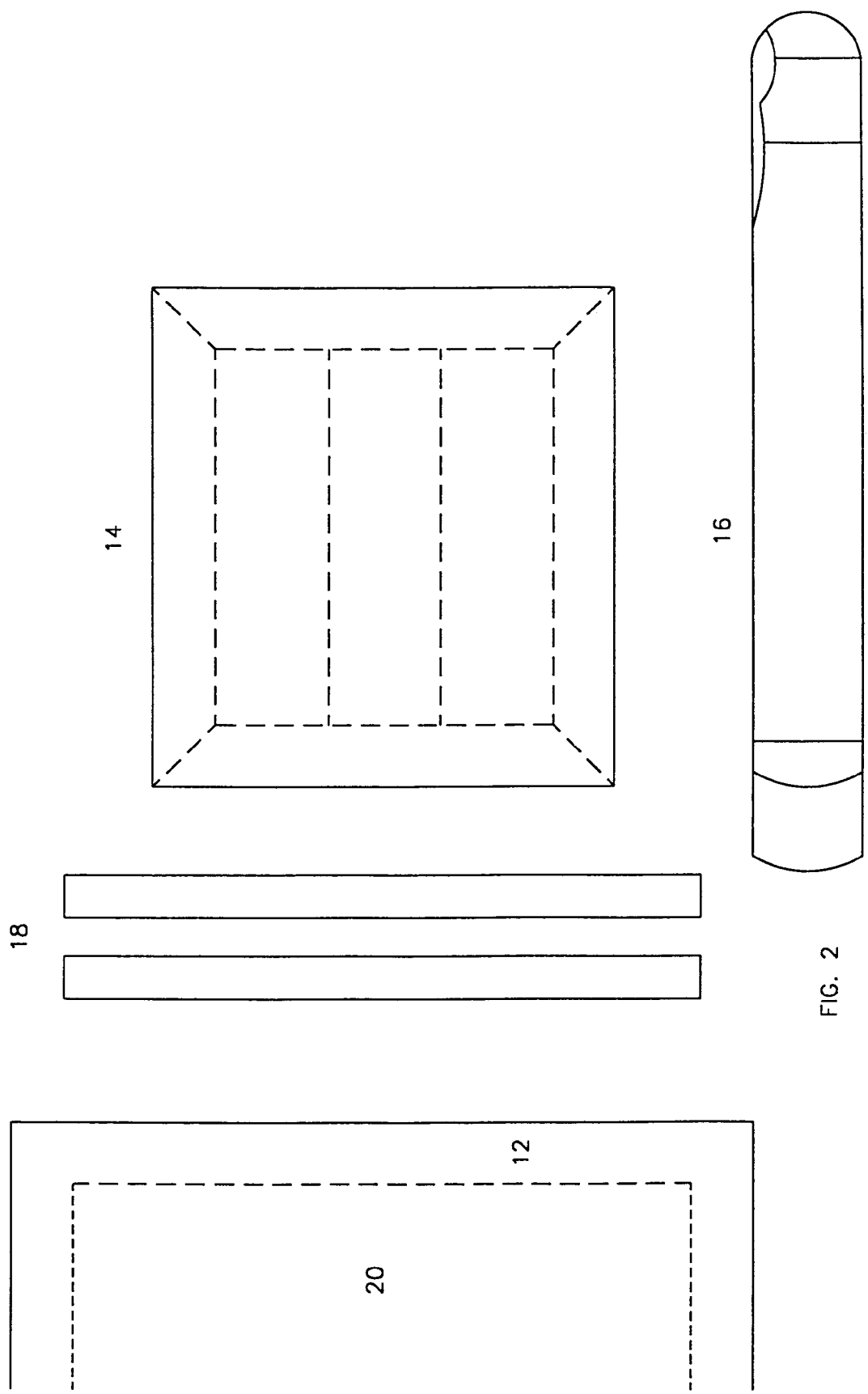
FIG. 2 shows top flap and other parts of the case.

A separate patch of cloth 14, as shown in FIG. 2, is sewn to the back of the denim case 30. This patch provides a vertical slot, for inserting a long, thin metal clip, called a banker's clasp 16, that can be purchased from Acco USA, Inc., Wheeling, Ill.

This thin, metal clasp, long enough to extend the whole vertical depth of a motor-vehicle sunvisor, securely holds the case, with monitor, to the retracted side of the sunvisor; and holds the case and monitor securely when the sunvisor 22 (as shown in FIG. 3) is lowered, and the monitor is in front of the face of the truck driver.

As shown in FIG. 3, the video and power supply cables that extend from the left top of the denim case, through the gap where the top flap folds over, are wrapped in spiral wrap 28, obtainable from RadioShack, to make one organized strand, rather than two loose strands of wire. The video and power supply lead cables, with plugs, come with the monitor when purchased.

As shown in FIG. 2, the top flap 20 that folds over is attached by a ¼" wide strip of Velcro 18 that extends the length of the flap. Opening of the top flap allows the monitor to be put in or taken out of the case.

The video cable and power supply cable, coming from the monitor, and made one strand by spiral wrap, follow the contours of the left windshield and are held in place by general purpose cable clips, available from RadioShack. These have an adhesive backing that allows fixing them to the left interior wall of the tractor cab.

Underneath the dashboard of the tractor cab, the power supply cable is fitted with a device that lowers 12 volt DC power from the tractor's battery to about 8 volts that is compatible with the circuitry of the 2.9" LCD monitor. This voltage drop is accomplished by insertion, in line, of a transistorized voltage regulator. The one I use is obtained from Fifth Avenue Antigue Auto Parts, Clay Center, Kans. Its orginal purpose is to attach to 6 volt dashboard gauges of old classic cars, to allow use of a 12 volt power supply.

To cover this in line, voltage-drop device, that is about 1¼" in length, I use a piece of ¾" diameter CPVC plastic plumbing pipe, use for drinking water lines. This is inexpensive, and does the job of covering and protecting the trasistorized voltage-drop component. It is available from plumbing supply stores such as Sears Hardware.

After the voltage-drop component is in place, I attach the outward length of the DC power supply wire, in a tap-in connection, under the dashboard, to the outgoing positive wire of the back-up light circuit. This positive wire of the back-up light circuit is normally colored purple. A weatherproofed tap-in device, available from RadioShack, is used. The wire from the voltage-drop to tap-in device is 18 gauge.

Important: The CITIZEN M-329 2.9" LCD monitor is a negative ground device. The live wire is positive. Some European-made trucks have a positive-ground electrical system. The monitor will not operate with a positive ground; in fact, connecting the monitor to a positive ground may seriously damage the monitor.

The idea of the tap-in connection to the back-up light circuit is so that the truck driver can turn on the back-up light switch, when he is about to back up the tractor/trailer rig, and the monitor will turn on. Also, as will be described later, the micro-video, pin-holed lens camera at the back of the trailer will turn on simutaneously. It, too, will be connected by a weather-proofed, tap-in device to the back-up light circuit at the rear of the trailer.

Off and On is accomplished by the truck's back-up light switch, preventing wear and tear of the power switch of the 2.9" LCD monitor.

Let us now focus on the video cable that comes from the 2.9" LCD monitor.

The cable strand that is included with the purchase of the monitor has at one end a plug that fits the jack on the left side of the monitor. On the other end of this cable strand is an RCA phono plug.

The video cable needs to be lengthened. A connector available from RadioShack accepts a phono plug and fits an F-connector.

A strand of RG-6QS (Quad shield) 75 ohm coaxial cable attached at the end by an RG-6 F-connector, available from RadioShack, attaches to an F-connector coupler, which in turn attaches to an F-connector/phono-plug connector.

This strand of RG-6QS (Quad shield) video cable extends to the area beneath the dashboard of the tractor cab. The Quad shield coaxial cable, that has 4 layers of shielding, is used beneath the dashboard to prevent magnetic-field interference from the tractor's electrical motors, such as the alterator.

This Quad shield video cable bends at the level of the floorboard of the cab, and lies flat on the floorboard on top, or beneath, a flooring mat.

Here the device that reverses the image is installed. It too lies flat on the floor. The Quad shield section, with weather-proofed F-connector attached, connects to the place on the high isolation switch marked TO CABLE.

This high isolation switch, normally installed, in line, in a cable television coaxial cable going to a residential house, to help prevent signal interference, available from RadioShack, is fortunately reversible, meaning the connections can be reversed to obtain the mirror image in the 2.9" monitor screen, so necessary to improving a close-circuit televison system to be applicable in the trucking industry for backing-up a tractor/trailer easily and safely.

One other piece of Quad shield cable, with weatherproofed F-connector, is attached to the other position on the high isolation switch that says TO TV.

Now, the remaining loose end of this second piece of Quad shield cable has to connect with a section of video coaxial cable from the attached motor-freight trailer.

Here I Will Explain how This is Done:

Remember that the rear end of the cab is not the rear end of the tractor. The tractor extends to the rear beyond the vertical rear end of the cab. On this extended rear platform of the tractor is the place where the overlapping trailer connects to the tractor.

Once the connection is made, one can see a distance of several feet between the front surface of the box trailer and back side of the cab.

Connecting wires of various sorts cross this gap between tractor cab and trailer.

Part of the problem is that Quad shield coaxial cable, that does the best job of shielding from magnetic fields that interfere with closed-circuit television video signals, does not bend very well. It cannot be curled up in a coil, so that it can uncoil when the trailer stretches to the right (or left) in a sharp turn. You do not want a droopy cable either.

The solution is to think of a connection axis to axis rather than a connection front-of-trailer to back-of-cab (axis being the point around which a body rotates).

This allows use of one strand of Quad shield cable to connect the trailer and the tractor. The Quad shield cable does not have to bend. There is no droopy cable.

To accomplish this, one routes the video cable from the extreme rear of the trailer, along the side of the trailer, following the path of other electrical wires. Then at the front of the trailer, one routes the video cable in a right-angle, inward turn toward the connecting axis of the trailer (the part that fits into the grove on the back platform of the tractor).

The video cable does not go to the connector axis, but just in front. There the cable is firmly attached to the underside of the floor of the trailer by a strip of SUPERLOCK (hook and loop fastener), available from RadioShack, after the cable is bent in a right angle, so it now proceeds forward in straight line, down the middle, to travel the several more feet to the front of the box trailer.

This loose end of a cable, underneath the floor of the trailer, does not have to move left or right when the front of the trailer moves left or right.

This loose end of a cable is attached just in front of the axis, the joining point of trailer to tractor.

When the trailer is not attached to a tractor, this loose end of a cable can be secured just under the front end of the trailer.

This loose end of a video cable has a weather-proofed F-connector as its forward end. A terminator cap can be inserted to the open end of the F-connector to protect the interior when the F-connector is not being used to connect to a cable section from the tractor.

The back of the cab is actually at the axis of the tractor. The backside of the cab is approximately the middle mark of the tractor. The sets of wheels and tires on the rear of the tractor, that support the front of the trailer, are behind the cab.

So, one drills a hole at the bottom, in the center, at the rear of the cab to allow the loose strand of Quad shield cable, extending from the high isolation switch (lying on the floor of the cab, under the seats), to pass to the outside.

Into the hole, plastic wall-feed-through bushings for RG-6 cable (available from RadioShack) are secured by epoxy glue. The loose strand of Quad shield cable passes through. A gold-plated, twist-on F-connector (available from RadioShack) is attached to the Quad shield loose end.

A gold-plated coupler is attached to the twist-on F-connector. The gold plate resists corrosion/oxidation. The loose end Quad shield cable is made the right length to attach to the complementary cable of the trailer. When not connected to a trailer, this loose end Quad shield cable can be secured to the rear (or under the rear) of the cab.

Video Camera

It takes two improvements, working in tandem, to make a tractor/trailer back-up kit that effectively solves the problem of "backing blind".

The improvements of a closed circuit television system are the sunvisor-mounted case for cradling a camcorder-type LCD monitor and the plate-mounted enclosure for a micro-video, pin-holed lens camera.

I will now describe the second improvement:

The enclosure for the micro-video, pin-holed lens camera is available from PacTec, Concordville, Pa. It is Model No. K-JM 22-IE. Its outer dimensions are about 2.4"×2.25"×1.0". It is made of plastic; its walls are about 0.125" thick. The color is bone.

The micro-video, pin-holed lens camera is available as a circuit board, with 2.8 mm pin hole lens. It is manufactured by Pioneer, Seoul, South Korea. It has dimensions of approximately 1.5"×1.5"×0.55". The depth includes the lens housing. Soldered to the circuit board are power supply and video cable leads.

To protect the circuit board camera, I seal it in a 2"×3" zip-lock, transparent, plastic bag that protects from static electricity (available from Uline, Waukegan, Ill.). I cut a precise hole in the bag to allow the camera's lens housing, ⅝" in diameter, to be outside the bag that protects the circuit board. I seal the perimeter of this hole with electrical tape.

I then drill two holes in the plastic enclosure—one is a hole ⅝" in diameter in the center of the front face of the enclosure; the other is a hole ½" in diameter in the 1.0" wide top of the enclosure.

The lens housing of the circuit board camera fits into the ⅝" hole. The ½" hole in the top of the enclosure is so that the power supply and video cable leads can exit the enclosure.

A ½" plastic, stress-relief (available from RadioShack) will be inserted in the ½" hole, to protect the cable leads as they exit the enclosure. Also, the stress-relief device allows a secure fit. Quick-drying, moisture-proofing glue (available from RadioShack) is used to ensure a weather-proof seal. The enclosure comes in two halves that hold together by machine screws.

When the lens housing of the circuit board camera is put in place in the ⅝" hole in the front section of the enclosure, there is considerable open space left inside the enclosure, because the circuit board is wafer thin. The whole weight of the circuit board camera, including the pin hole lens and its metal lens housing, is only 28 grams (1.0 ounce).

I fill that empty space left in the circuit-board-installed enclosure with Miraflex fiber insulation, made by Owens Corning. It looks like fluffs of cotton. It is the kind of insulation used in attics of houses.

It insulates superbly from extremes of heat and cold. The circuit board camera has an ambient temperature operating range of 14° F. to 122° F. (−10° C. to 50° C.). In particular, the insulation is needed to protect from outdoor temperatures colder than 14° F. (−10° C.).

An optional step is to wrap the circuit-board protecting, static-free, zip-lock bag with a layer of heavy duty aluminum foil, as protection against magnetic fields generated by electric motors.

Since the enclosure will be mounted at the back of a motor vehicle or trailer, not at the front of the truck, or tractor, where the alternator is located, magnetic fields should not be a problem to the circuit board camera itself. Heavily shielded coaxial cable is used to carry the video transmission from the camera to the monitor. PacTec, the manufacturer of the plastic enclosure, will provide built-in-shielding in its enclosure for an extra charge.

The next item to consider is the pane of glass-like, transparent, insulating plastic, ⅛" thick, that is epoxy glued to the front face of the enclosure. A plastic of these qualities is found in LEXAN XL, manufactured by GE Structural Products Division, Mt. Vernon, Ind., for use as window panes in residential houses.

A window-sized pane can be cut up in many small sections of dimensions 2⅜"×2¼". Such a piece then is the dimension of the front face of the enclosure.

This pane has three important functions:

(1) the glass-like surface of the pane makes a stronger bond to a metal plate than does a non-glass-like surface such as plastic of which the enclosure itself is made, when epoxy glue is used as the adhesive.

The glass-like pane is cut the full size of the front of the enclosure to give more surface area fro adhesion (by epoxy bonding).

Also, if the pane were cut just large enough to cover the ⅝" hole (where the outer face of the lens housing lies flush with the front surface of the enclosure), there would be a gap of ⅛" (the thickness of the pane) above and below the tiny pane, because the purpose is to mount the enclosure to the back of a plate, such as a license plate at the rear of a motor vehicle, or trailer.

In winter this gap could fill up with ice and could cause stress against the epoxy bond.

(2) The transparent pane gives protection of the pin hole lens from moisture, dirt, and scratches, and allows the camera to see through the protective pane.

(3) The insulating pane, of ⅛" thickness, is especially important to protect the metal lens housing from extremes of cold that could be conducted to contiguous internal camera components to cause inoperation of the camera.

Without the intermediary, insulating pane, between the back of the metal plate and the metal lens housing, the weather-exposed plate could pass its coldness, in winter conditions, to the metal lens housing.

The idea is to make the standard enclosure adaptable to being mounted on the back of a license plate outdoors, in weather of any nature. A micro-video, pin-holed lens camera that becomes inoperative because of cold temperature at the first blizzard is unacceptable. The pane adds needed protection in all-weather conditions, to which a tractor/trailer rig are exposed.

The LEXAN XL pane has the additional property that it is coated so as to be protected from ultra-violet radiation, that can cause deterioration of surfaces exposed outdoors.

Before I glue the pane to the front face of the enclosure, I paint the front of the metal lens housing with white urethane, using a cotton Q-tip to keep urethane paint from touching the pin hole lens.

This paint can be a different color. The large, overall idea is to make this video camera invisible, or as close to that as possible.

A hole needs to be cut in the plate, such as a license plate, so the pin holed lens can see through. In order to have maximum width of field of view for the lens whose unobstructed field of view is 90 degrees, the hole in the plate needs to be ¼" to ⅜" in diameter.

The metal housing of the pin hole lens is black. There is no need to have a black hole ¼" to ⅜" visible in the plate whose typical background color (exclusive of numbers/letters) is white.

When the front of the lens housing is painted to match the background color of the plate, the hole for the pin holed lens to see through is not noticeable.

After the front of the metal lens housing has been painted, and the paint has dried, the pane is epoxy glued to the front of the enclosure, to cover the lens housing that lies flush with the front face of the enclosure.

Care must be taken bonding the pane so as to make a weather-proof seal. This operation should be done in an air-conditioned room where the humidity is low, to prevent moisture accumulating on the pin hole lens.

The perimeter of the lens housing should be coated with epoxy, being carefull not to put an excess that when pressed to the pane would spread onto the pin hole lens. The perimeter of the front face of the enclosure also should be coated with epoxy, being very careful that there are no gaps, in order to ensure a weather-proof seal.

When the pane-protected enclosure is ready to mount on the back side of a plate, such as a license plate, that has the appropriate hole drilled in it, care must be taken to center the pin hole lens in the center of the hole in the plate, to allow maximum view of view; and care must be taken to epoxy glue securely the glass-like front surface of the enclosure to the back of the metal plate.

Ideally, the plate should be mounted in the middle at the rear of the motor vehicle, or trailer, which is the place where the plate, such as license plate, is most commonly mounted. On a motor-freight trailer, the license plate is mounted just under the bed of the trailer, at the rear. Here it is protected from rain and direct sunlight. Also, its ordinary placement will not alert potential vandals that there is anything unusual, or special, about the plate.

Next is to provide a power supply to the micro-video, pin-holed lens camera:

The power cable lead exiting the top of the enclosure is spliced to a two-conductor cable, of 18 gauge stranded conductors, color coded red and black for easy hookup.

A tap-in connection is made to the back-up light, either left or right.

The positive wire of the power supply for the back-up light is usually purple in color. The owner's handbook for the trailer, or motor vehicle, will give the wiring schematic to identify the back-up light circuit.

The micro-video, pin-holed lens camera is designed for negative ground. Connecting the camera opposite to this mode can seriously damage the camera. The conductor cable is connected to the camera power supply lead by splicing the two red segments and then splicing the two black segments.

At the tap-in connection to the backup light circuit, the red insulated wire from the camera is tapped into the purple insulated wire of the back-up light circuit. A weather-proofed tap-in device (available from RadioShack) is used. The black insulated wire from the camera connects to a ground.

When the switch fro the back-up lights is turned on in the cab of the tractor, or motor vehicle, the micro-video, pin-holed lens camera turns on, as well as the rear back-up lights.

Last of all, the video cable lead from the top of the enclosure is connected to a 50 ft. 75 ohm RG-6 heavily shielded coaxial cable (available from RadioShack) that extends the length of a motor-freight trailer, passing under the bed of the trailer, either on left or right side, following the route of other electrical wiring for the trailer, and secured by wiring ties (available from RadioShack). So as to avoid repetition, all of the items described forthwith are available from Radio Shack.

The 50 ft. coaxial cable has a weather-proofed F-connector crimped on at each end. The video lead coming from the top of the enclosure has on its end an RCA phono plug. A coax connector that accepts a phono plug and fits an F-connector is used to join the two video cables. This connector is wrapped with weather-proofing tape.

At the front of the trailer, the extended length of video coaxial cable can be joined to a segment of video coaxial cable coming from the tractor. The method for joining the two segments is described in the previous descriptive section dealing with the monitor.

Operation

When the driver wants to back up, he pulls down his sunvisor. The case containing the thin, camcorder-type LCD monitor is mounted on the retracted side of the driver's sunvisor.

So, upon pulling the sunvisor down, the driver sees the monitor directly in front of him, at close range.

He turns on the switch for the back-up lights. The monitor screen lights up.

What the driver sees is a reverse image of what the micro-video, pin-holed lens, hidden behind a plate, such as a license plate, at the rear of the trailer being pulled, sees, facing in the opposite direction.

For the driver, looking in the monitor is no more difficult than looking in a rear view mirror. The picture the driver sees is not faded, even if the sun is shining brightly into the cab, because the sunvisor, pulled down, blocks the direct rays of the sun.

The image in the screen of the 2.9" LCD monitor fades if one happens to view the screen from an oblique angle; but here the driver sees the monitor screen, mounted on his sunvisor, directly in front of him. The picture is bright and clear.

When he is through backing, the driver folds up the sunvisor and turns off the switch for the back-up lights (that de-activates the improved close circuit television system designed for motor vehicles and tractor/trailer rigs.

When the driver was backing, his field of view showed him in detail the loading dock to which he was approaching, even though to back his rig, he had to point his tractor in one direction and his trailer in another, while backing into a tight space.

It could be night, with a few lights on the loading dock. The micro-video, pin-holed lens, mounted secretly on the back of the license plate of the trailer, will see. The pin-holed lens has a LUX rating of 0.5. The image quality in low light, bright light, is amazing! This is due to the advances in just the past several years, in CCD imager technology.

My improvements in a closed circuit television system adaptable to motor-freight tractor/trailer rigs, to solve the problem of "backing blind", could not have happened but for the improvements in small, LCD monitors, and CCD imager technology allowing the manufacture of the micro-video, pin-holed lens camera with attributes that adapt so well to the motor-freight tractor/trailer rig.

CONCLUSION, RAMIFICATIONS, AND SCOPE OF INVENTION

My two improvements of a closed circuit television system applicable to a motor-freight tractor/trailer rig, or a motor vehicle, to see to the rear when the unaided view is obstructed, are:

1. A sunvisor-mounted case, with a window, for cradling a camcorder-type LCD monitor, to provide protection for the monitor from heat, cold, vibrations, and bright sunlight, to allow a driver easy, direct, close-range, sunlight-protected viewing of the monitor screen, as if the screen were a rear view mirror, while backing up a motor vehicle, or a tractor with attached trailer.

2. A weather-proofed enclosure for mounting on the reverse side of a plate, such as a license plate, located at the rear of a motor vehicle, or trailer, to protect a micro-video, pin-holed lens camera.

These two improvements together meet a long-felt but unsolved need in the trucking industry, namely, solving the problem of "backing blind", thereby (1) avoiding costly accidents, (2) increasing efficiency of making deliveries and pickups, thus, increasing profits, (3) increasing morale of drivers, and (4) making the training of new drivers easier.

While my above description contains many specificities, these should not be construed as limitations on the scope of the invention, but rather as an exemplication of one preferred embodiment thereof. Many other variations are possible. For example:

A case is a form of covering. A covering could be fixed to the outside of the monitor itself.

The case or covering could be made of a variety of materials that provide insulation.

Means for mounting the case to the sunvisor can vary, e.g., the shape, size, and material of the clip or clasp can vary; the clip or clasp could be attached by an adhesive backing.

The rear plate, to which the enclosure for the micro-video, pin-holed lens camera is mounted, need not be a license plate but could be a plate with a company logo on it, or with a phrase on it, such as Drive Safely.

The means for mounting the enclosure on the back side of the plate can vary, e.g., by using machine screws, and washers, rather than epoxy glue, as long as weather-proof integrity of the enclosure was maintained. (I chose to epoxy glue the enclosure to the plate so no screw heads and washers would show on the front side of the plate, to add to concealment.)

The pane that attaches to the front face of the enclosure could be made of another material besides LEXAN XL. The dimensions of the pane could vary.

Also the dimensions, material, and color of the enclosure could vary.

Accordingly, the scope of the invention should be determined not by the embodiment(s) illustrated, but by the appended claims and their legal equivalents.

I claim:

1. An assembly of a camcorder-type liquid crystal display monitor, comprising means for mounting said assembly to the inner retracted side of a driver's sunvisor of a motor vehicle, whereby said sunvisor, when lowered, allows a driver easy, direct, close-range, sunlight-protected viewing of said monitor screen, as if the screen were a rear-view mirror, when used in conjunction with a video camera, to see to the rear when the unaided view is obstructed.

2. An assembly of a micro-video, pin-holed lens camera, comprising means for mounting said assembly on the reverse side of a license plate at the rear of a trailer or motor vehicle, so that said camera can see through a predetermined-sized hole put in said plate, whereby said plate-mounted assembly conceals said pin-holed lens camera to lessen the risk of vandalism, whereby said camera is located in a position at the rear of a trailer or motor vehicle for viewing a backing, when used in conjunction with a monitor.

* * * * *

UNITED STATES PATENT AND TRADEMARK OFFICE
CERTIFICATE OF CORRECTION

| | | |
|---|---|---|
| PATENT NO. | : 7,184,074 B1 | Page 1 of 1 |
| APPLICATION NO. | : 09/232566 | |
| DATED | : February 27, 2007 | |
| INVENTOR(S) | : Rolf Jansen | |

It is certified that error appears in the above-identified patent and that said Letters Patent is hereby corrected as shown below:

Col. 16 lines 31-40
Claim 2, delete

"An assembly of a micro-video, pin-holed lens camera, comprising means for mounting said assembly on the reverse side of a license plate at the rear of a trailer or motor vehicle, so that said camera can see through a predetermined-sized hole put in said plate, whereby said plate-mounted assembly conceals said pin-holed lens camera to lessen the risk of vandalism, whereby said camera is located in a position at the rear of a trailer or motor vehicle for viewing a backing, when used in conjunction with a monitor.", and replace --An assembly of a micro-video, pin-holed lens camera, comprising means for mounting said assembly on the reverse side of a plate, such as a license plate, at the rear of a trailer or motor vehicle, so that said camera can see through a predetermined-sized hole put in said plate, whereby said plate-mounted assembly conceals said pin-holed lens camera to lessen the risk of vandalism, whereby said camera is located in the ideal position at the rear of a trailer or motor vehicle for viewing a backing, when used in conjunction with a monitor.--

Signed and Sealed this

Tenth Day of April, 2007

JON W. DUDAS
*Director of the United States Patent and Trademark Office*